(12) United States Patent
Khoryaev et al.

(10) Patent No.: US 9,998,858 B2
(45) Date of Patent: Jun. 12, 2018

(54) TECHNIQUES FOR ADJACENT CHANNEL INTERFERENCE MITIGATION

(71) Applicant: Intel Corporation, Santa Clara, CA (US)

(72) Inventors: Alexey Khoryaev, Nizhny Novgorod (RU); Sergey Panteleev, Nizhny Novgorod (RU); Mikhail Shilov, Nizhny Novgorod (RU); Andrey Chervyakov, Nizhny Novgorod (RU); Jong-Kae Fwu, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 15 days.

(21) Appl. No.: 14/771,269

(22) PCT Filed: Apr. 3, 2014

(86) PCT No.: PCT/US2014/032792
§ 371 (c)(1),
(2) Date: Aug. 28, 2015

(87) PCT Pub. No.: WO2014/165654
PCT Pub. Date: Oct. 9, 2014

(65) Prior Publication Data
US 2016/0007302 A1 Jan. 7, 2016

Related U.S. Application Data

(60) Provisional application No. 61/809,157, filed on Apr. 5, 2013.

(51) Int. Cl.
*H04W 52/24* (2009.01)
*H04W 4/02* (2018.01)
(Continued)

(52) U.S. Cl.
CPC ............ *H04W 4/021* (2013.01); *H04L 67/16* (2013.01); *H04L 67/28* (2013.01); *H04W 4/00* (2013.01);
(Continued)

(58) Field of Classification Search
CPC ....... H04W 4/021; H04W 4/00; H04W 4/008; H04L 67/16; H04L 67/28
See application file for complete search history.

(56) References Cited

U.S. PATENT DOCUMENTS

2009/0082026 A1 3/2009 Yavuz et al.
2011/0085513 A1 4/2011 Chen et al.
(Continued)

FOREIGN PATENT DOCUMENTS

WO 2012088948 7/2012

OTHER PUBLICATIONS

Supplementary European Search Report received for European Patent Application No. 16169936.8, dated Aug. 29, 2016, 4 pages.
(Continued)

*Primary Examiner* — Albert T Chou

(57) ABSTRACT

Techniques for adjacent channel interference mitigation are described. In one embodiment, for example, a user equipment (UE) may comprise logic, at least a portion of which is in hardware, the logic to associate the UE with a pico evolved node B (eNB) in a time-division duplex (TDD) picocell, identify an incongruent uplink (UL) sub-frame for the picocell, and select an enhanced UL transmit power for the incongruent UL sub-frame. Other embodiments are described and claimed.

22 Claims, 9 Drawing Sheets

(51) Int. Cl.
*H04W 76/02* (2009.01)
*H04W 72/04* (2009.01)
*H04W 4/00* (2018.01)
*H04L 29/08* (2006.01)
*H04W 84/12* (2009.01)
*H04W 52/10* (2009.01)

(52) U.S. Cl.
CPC ......... *H04W 4/008* (2013.01); *H04W 52/244* (2013.01); *H04W 72/042* (2013.01); *H04W 72/0413* (2013.01); *H04W 72/0473* (2013.01); *H04W 76/021* (2013.01); *H04W 76/023* (2013.01); *H04W 52/10* (2013.01); *H04W 84/12* (2013.01)

(56) References Cited

U.S. PATENT DOCUMENTS

| | | |
|---|---|---|
| 2011/0149813 A1 | 6/2011 | Parkvall et al. |
| 2011/0235582 A1 | 9/2011 | Chen et al. |
| 2012/0039265 A1 | 2/2012 | Patel et al. |
| 2012/0071106 A1 | 3/2012 | Kadous et al. |
| 2013/0195025 A1* | 8/2013 | Chatterjee ......... H04W 72/0493 370/329 |
| 2013/0315115 A1 | 11/2013 | Kim et al. |
| 2014/0022961 A1* | 1/2014 | Park .................... H04W 52/146 370/280 |
| 2014/0192686 A1* | 7/2014 | Hammarwall ............ H04L 5/14 370/280 |
| 2014/0293846 A1* | 10/2014 | Meng .................... H04L 5/1438 370/280 |
| 2014/0307598 A1* | 10/2014 | Mizusawa ......... H04W 72/0446 370/280 |
| 2015/0245246 A1* | 8/2015 | Golitschek Edler von Elbwart ............... H04L 5/0094 370/280 |
| 2015/0341866 A1* | 11/2015 | Park .................... H04W 72/042 455/522 |

OTHER PUBLICATIONS

Office Action and Search Report received for Taiwanese Patent Application No. 104132547, dated Sep. 23, 2016, 10 pages including 4 pages English translation.

International Search Report and Written Opinion received for PCT Patent Application No. PCT/US2014/032792, dated Aug. 19, 2014, 12 pages.

Lindbom et al., "Enhanced Inter-cell Interference Coordination for tero geneous Networks in LTE-Advanced: A Survey", Dec. 7, 2011, 18 pages.

"Further enhancements to LTE Time Division Duplex (TDD) for Downlink-Uplink (DL-UL) interference management and traffic adaptation", 3GPP TR 36.828, Release 11, V11.0.0, Jun. 2012, 109 pages.

"New work item proposal for Further Enhancements to LTE TDD for DL-UL Interference Management and Traffic Adaptation", CATT, RP-121772, Dec. 2012.

"Way forward on deployment scenarios for TDD eIMTA work item", CATT, R1-130760, Jan. 2013, 2 pages (author unknown).

"Performance analysis of DL-UL interference management and traffic adaptation in multi-cell Pico-Pico deployment scenario", Intel Corporation, R1-121529, Mar. 2012, 12 pages (author unknown).

"Performance analysis of interference mitigation schemes for Macro-Pico adjacent channel scenario", Intel Corporation, R1-130914, Apr. 2013, 6 pages (author unknown).

"DL-UL interference analysis for single operator Macro-Outdoor Pico deployment scenario in adjacent channel", Intel Corporation, R4-120837, Feb. 2012, 6 pages (author unknown).

Partial supplementary Search Report received for European Patent Application No. 14779682.5, dated Oct. 14, 2016, 8 pages.

* cited by examiner

Timing Frame 202

| DL | Special | UL | UL | DL | DL | Special | UL | UL | DL |
|---|---|---|---|---|---|---|---|---|---|
| 204-1 | 204-2 | 204-3 | 204-4 | 204-5 | 204-6 | 204-7 | 204-8 | 204-9 | 204-10 |

Timing Frame 202

| DL | Special | UL | DL | DL | DL | DL | DL | DL | DL |
|---|---|---|---|---|---|---|---|---|---|
| 204-1 | 204-2 | 204-3 | 204-4 | 204-5 | 204-6 | 204-7 | 204-8 | 204-9 | 204-10 |

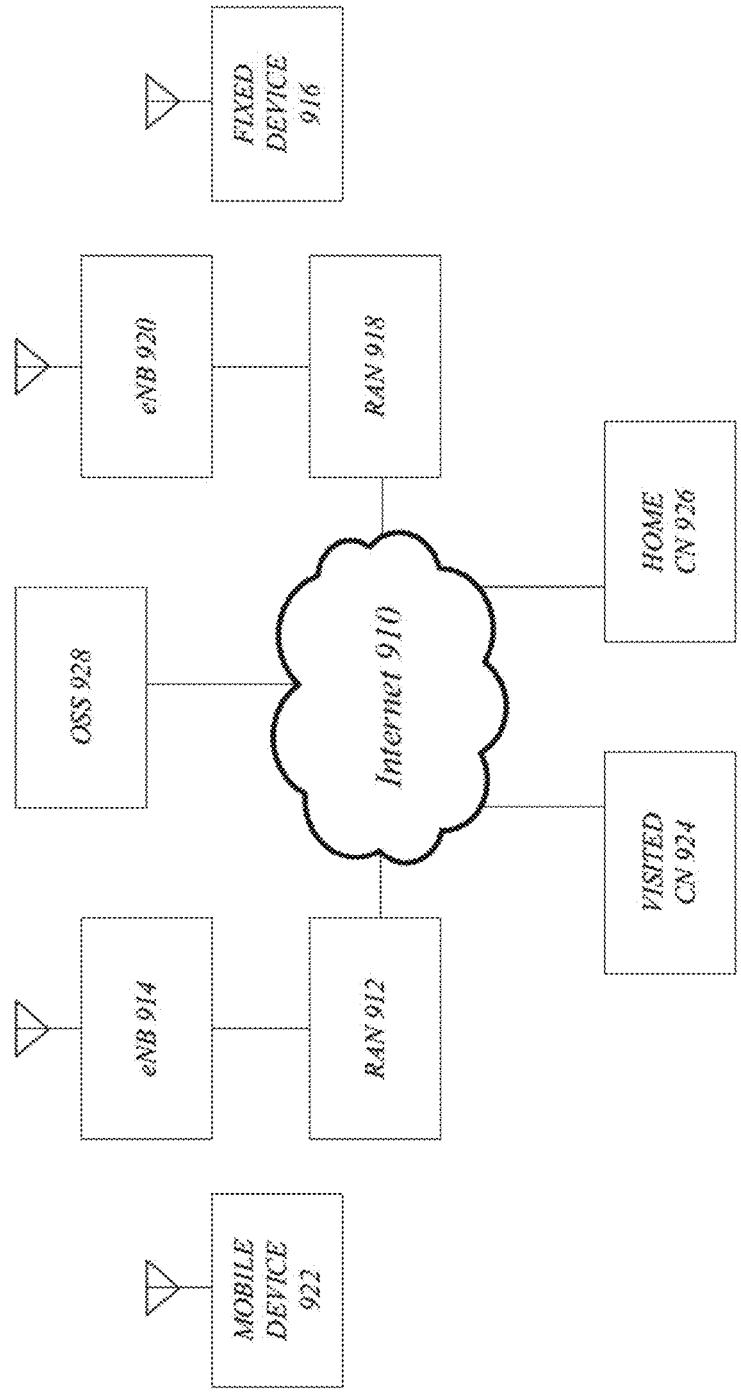

TECHNIQUES FOR ADJACENT CHANNEL INTERFERENCE MITIGATION

RELATED CASE

This application claims priority to U.S. Provisional Patent Application No. 61/809,157, filed Apr. 5, 2013, the entirety of which is hereby incorporated by reference.

TECHNICAL FIELD

Embodiments herein generally relate to communications between devices in broadband wireless communications networks.

BACKGROUND

In a broadband wireless communications network that implements time division duplexing (TDD), it may be possible to configure different cells with different TDD configurations. In some cases, a small cell such as a picocell may be configured with a different TDD configuration than that of a macrocell within or near which the small cell is located. Further, according to some implementations, the TDD configuration for the macrocell may be static while the small cell TDD configuration may be dynamically selected based on traffic conditions within the small cell. For example, in a Time-Division Long-Term Evolution (TD-LTE) wireless network (also sometimes referred to as an LTE TDD wireless network), an evolved node B (eNB) serving a picocell may dynamically select a TDD configuration for the picocell based on the relative amounts of uplink (UL) and downlink (DL) traffic in the picocell.

If the TDD configurations of any two particular cells differ, then the transmission directions within those respective cells may differ during some sub-frames. Namely, during some sub-frames, UL transmissions may be performed in one cell while DL transmissions are performed in the other cell. In the case of a macrocell implementing a TDD configuration that differs from the TDD configuration of a small cell within or near the macrocell, the opposite transmission directions during such sub-frames may tend to cause mutual interference between the macrocell and the small cell if the macrocell and the small cell use adjacent respective frequency channels. Particularly, DL transmissions in the macrocell may tend to interfere with UL transmissions in the small cell, and DL transmissions in the small cell may tend to interfere with UL transmissions in the macrocell.

BRIEF DESCRIPTION OF THE DRAWINGS

FIG. 2A illustrates an embodiment of a first TDD configuration.
FIG. 2B illustrates an embodiment of a second TDD configuration.
FIG. 9 illustrates an embodiment of wireless network.

DETAILED DESCRIPTION

Figure 1:
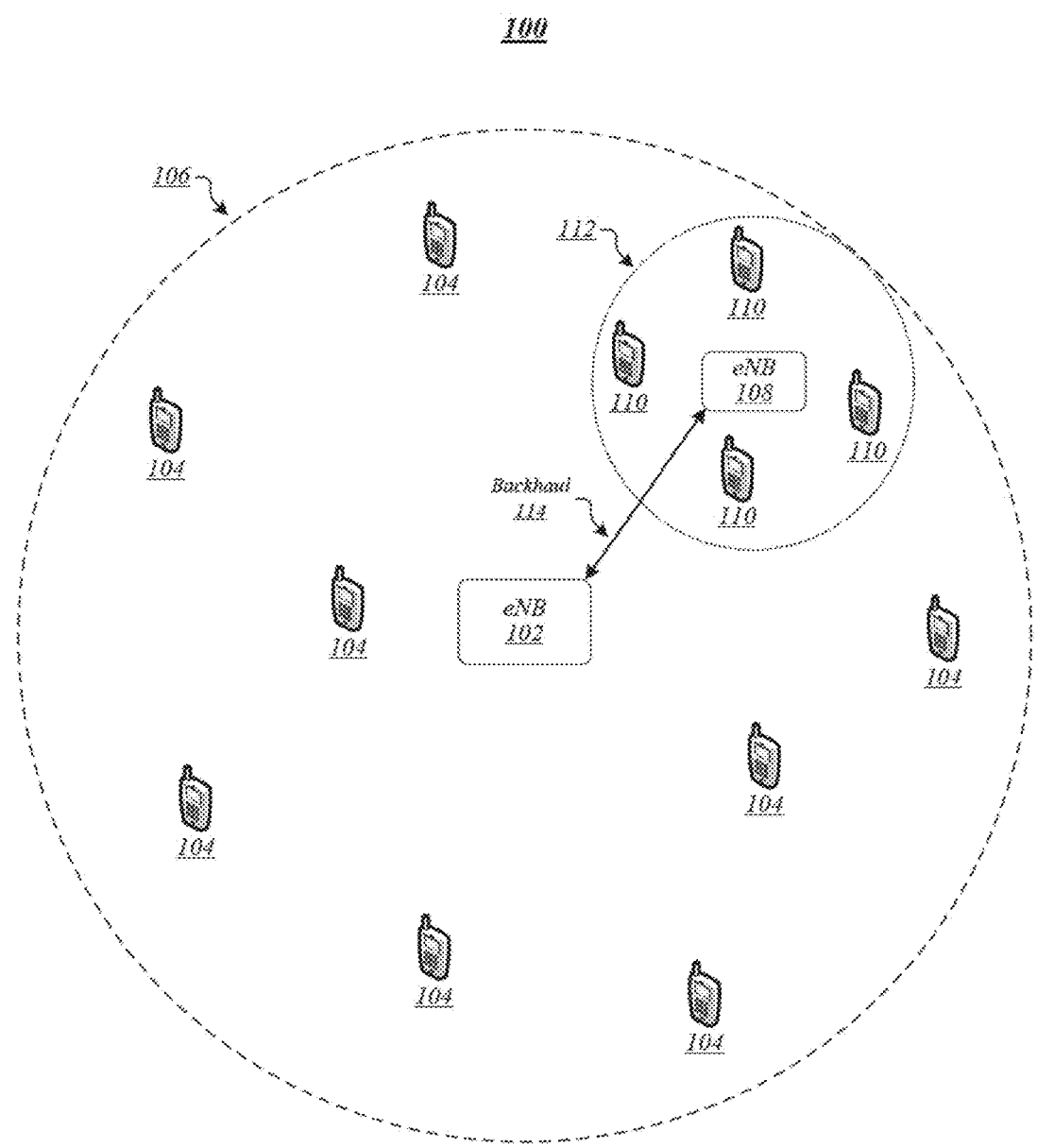
FIG. 1 illustrates an embodiment of an operating environment.

Various embodiments may be generally directed to techniques for adjacent channel interference mitigation. In one embodiment, for example, a user equipment (UE) may comprise logic, at least a portion of which is in hardware, the logic to associate the UE with a pico evolved node B (eNB) in a time-division duplex (TDD) picocell, identify an incongruent uplink (UL) sub-frame for the picocell, and select an enhanced UL transmit power for the incongruent UL sub-frame. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their revisions, progeny and variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their revisions, progeny and variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1xRTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their revisions, progeny and variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any revisions, progeny, and/or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an operating environment 100 such as may be representative of various embodiments. In operating environment 100, an eNB 102 generally provides wireless service to user equipment (UEs) 104 within a macrocell 106, while an eNB 108 generally provides wireless service to UEs 110 within a small cell 112 located within the macrocell 106. In some embodiments, small cell 112 may comprise a picocell. Other examples of small cell 112 may include, without limitation, a microcell, a femtocell, or another type of smaller-sized cell. In various embodiments, eNB 102 and eNB 108 may communicate over a backhaul 114. In some embodiments, backhaul 114 may comprise a wired backhaul. In various other embodiments, backhaul 114 may comprise a wireless backhaul. It is worthy of note that although small cell 112 is located within macrocell 106 in the example of FIG. 1, the embodiments are not so limited. In some embodiments, small cell 112 may comprise a neighboring cell of macrocell 106, or may simply be located relatively close to macrocell 106. The embodiments are not limited in this context.

In various embodiments, operating environment 100 may comprise a portion of an LTE radio access network (RAN), such as an E-UTRAN. In some embodiments, operating environment 100 may comprise a portion of an RAN that employs time-division duplexing (TDD). For example, in various embodiments, operating environment 100 may comprise a portion of an LTE TDD wireless network. In some embodiments, according to a TDD implementation in operating environment 100, eNBs 102 and 108 may communicate with UEs 104 and 110 according to one or more defined TDD configurations. In various embodiments, each such TDD configuration may specify the direction in which wireless communications are to be performed on a given wireless channel during each portion of each timing frame or other defined time interval. More particularly, for each portion of a given timing frame or other defined time interval, a TDD configuration may specify whether transmissions on a wireless channel are to be performed in the uplink (UL) direction or the downlink (DL) direction during that portion. For example, if a TDD configuration for eNB 102 specifies that DL transmissions are to be performed on a wireless channel during a particular sub-frame, then eNB 102 may be operative to transmit to one or more UEs 104 over the wireless channel during that sub-frame. The embodiments are not limited to this example.

FIG. 2A illustrates an example of a TDD configuration 200 that may be implemented by an eNB such as eNB 102 and/or eNB 108 of FIG. 1 in some embodiments. According to TDD configuration 200, a timing frame 202 is sub-divided into ten sub-frames 204-1 to 204-10. In various embodiments, timing frame 202 may comprise a duration of 10 ms, and each of sub-frames 204-1 to 204-10 may comprise a respective duration of 1 ms. In some other embodiments, timing frame 202 may comprise a different duration and/or a different number of sub-frames 204. Further, in various embodiments, the durations of some sub-frames 204 may differ from the durations of other sub-frames 204. The embodiments are not limited in this context.

As shown in FIG. 2A, TDD configuration 200 may assign some sub-frames 204 for UL transmissions and assign other sub-frames for DL transmissions. In this example, sub-frames 204-3, 204-4, 204-8, and 204-9 are designated as UL sub-frames, while sub-frames 204-1, 204-5, 204-6, and 204-10 are designated as DL sub-frames. TDD configuration may also sub-divide some sub-frames, and designate some portions within those sub-frames for UL transmissions while designating other portions within the same sub-frames for DL transmissions. In the example of FIG. 2A, sub-frames 204-2 and 204-7 comprise special sub-frames that may be sub-divided into UL and DL portions. If, in an example embodiment, eNB 102 of FIG. 1 implements TDD configuration 200, then eNB 102 may transmit to one or more UEs 104 over a wireless channel during sub-frames 204-1, 204-5, 204-6, and/or 204-10, and/or during portions of sub-frames 204-2 and/or 204-7, and may receive transmissions from one or more UEs 104 over the wireless channel during sub-frames 204-3, 204-4, 204-8, and/or 204-9, and/or during other portions of sub-frames 204-2 and/or 204-7. The embodiments are not limited in this context.

Returning to FIG. 1, in some embodiments, eNB 102 and eNB 108 may implement a same TDD configuration, such as the example TDD configuration 200 of FIG. 2A. However, in various embodiments, it may be desirable that eNB 108 implement a different TDD configuration than eNB 102. For example, in some embodiments, a balance between UL and DL traffic within small cell 112 may be different than a balance between UL sub-frames and DL sub-frames according to a TDD configuration implemented by eNB 102. In an example embodiment, there may be significantly more DL traffic than UL traffic in small cell 112. In such a case, the even balance between UL and DL sub-frames defined by TDD configuration 200 of FIG. 2A may be sub-optimal for use in small cell 112. Thus, in such a case, it may be desirable to implement a different TDD configuration in small cell 112, according to which more time resources are allocated for DL transmissions than are allocated for UL transmissions.

FIG. 2B illustrates an example of a TDD configuration 250 that may be implemented in small cell 112 in some embodiments. More particularly, TDD configuration 250 may comprise an example of a TDD configuration that allocates more time resources for DL transmissions than for UL transmissions. In the aforementioned example in which there is significantly more DL traffic than UL traffic in small cell 112 of FIG. 1, TDD configuration 250 may allocate resources in a manner that better reflects the UL/DL traffic balance within small cell 112. In TDD configuration 250, sub-frames 204-1, 204-4, 204-5, 204-6, 204-7, 204-8, 204-9, and 204-10 are each designated as DL sub-frames. Sub-frame 204-2 is designated as a special sub-frame, and only sub-frame 204-3 is designated as a UL sub-frame. In contrast to TDD configuration 200 of FIG. 2A, which features an even balance between UL and DL allocations, TDD configuration 250 heavily favors DL allocations. Thus, TDD configuration 250 may be more optimal for implementation in small cell 112 of FIG. 1 if there is substantially more DL traffic in small cell 112 than there is UL traffic.

It is worthy of note that TDD configuration 250 merely comprises one example of an alternate TDD configuration that might be implemented in small cell 112, and the embodiments are not limited to this particular example. Further, the scenario in which small cell 112 comprises substantially more DL traffic than UL traffic is merely one example of a scenario in which a TDD configuration other than TDD configuration 200 of FIG. 2A might be preferable for implementation within small cell 112. In various other embodiments, small cell 112 may comprise substantially more UL traffic than DL traffic, or there may be other reasons why it may be preferable to implement an alternate TDD configuration in small cell 112. Furthermore, the TDD configuration implemented in macrocell 106 may not necessarily be one that features an even balance between UL and DL allocations. The embodiments are not limited in this context.

Returning to FIG. 1, in some embodiments, the TDD configuration for macrocell 106 may be statically defined, while the TDD configuration for small cell 112 may be dynamic. In various embodiments, eNB 108 may dynamically select the TDD configuration for small cell 112 based on traffic characteristics within small cell 112. In some embodiments, a TDD configuration dynamically selected by eNB 108 for small cell 112 may differ from a static TDD configuration for macrocell 106. For example, in various embodiments, macrocell 106 may be statically configured with TDD configuration 200 of FIG. 2A, while eNB 108 may dynamically select TDD configuration 250 of FIG. 2B for small cell 112 based on traffic conditions within small cell 112. During some sub-frames in some embodiments in which eNBs 102 and 108 implement different TDD configurations, eNBs 102 and 108 may communicate in opposite directions. For example, if eNB 102 implements TDD configuration 200 of FIG. 2A and eNB 108 implements TDD configuration 250 of FIG. 2B, then during sub-frames 204-4, 204-8, and 204-9, eNB 102 may receive UL transmissions from UEs 104 while eNB 108 sends DL transmissions to UEs 110. The embodiments are not limited to this example.

As previously noted, a particular TDD configuration such as TDD configuration 200 of FIG. 2A or TDD configuration 250 of FIG. 2B may specify the directions for wireless communications over a particular wireless channel. In operating environment 100, eNB 102 may utilize a different frequency channel to communicate with UEs 104 than eNB 108 utilizes to communicate with UEs 110. However, in various embodiments, eNBs 102 and 108 may utilize respective frequency channels that are adjacent to each other. In some such embodiments, the use of adjacent frequency channels may tend to result in mutual interference between communications in macrocell 106 and communications in small cell 112 during some sub-frames. More particularly, the use of adjacent frequency channels may tend to result in mutual interference in sub-frames during which the transmission direction in macrocell 106 is opposite that in small cell 112. In sub-frames during which macrocell transmissions are performed in the DL direction and small cell transmissions are performed in the UL direction, DL transmissions in macrocell 106 may tend to interfere with UL transmissions in small cell 112. Similarly, in sub-frames during which macrocell transmissions are performed in the UL direction and small cell transmissions are performed in the DL direction, DL transmissions in small cell 112 may tend to interfere with UL transmissions in macrocell 106. The embodiments are not limited in this context.

Disclosed herein are techniques for mitigating interference between adjacent wireless communications channels. According to such techniques, the transmit powers of one or more transmissions performed in a small cell such as small cell 112 may be adjusted in order to reduce the likelihood and/or degree of interference between transmissions in the small cell and transmissions in a macrocell near or within which it resides, such as macrocell 106. In various embodiments, the techniques may additionally involve adjusting the transmit powers of one or more transmissions performed in the macrocell. In some embodiments in which a TDD configuration for the small cell can be dynamically selected, an adjacent channel association bias may be introduced that increases the tendency of UEs to associate with the small cell, thus allowing more traffic to make use of the dynamic TDD configuration capabilities of the small cell. At the same time, the adjacent channel association bias may reduce the amount of traffic handled by the macrocell, and in various embodiments, the reduced load may enable the macrocell eNB to refrain from performing potentially interfering DL transmissions during some sub-frames. The embodiments are not limited in this context.

Figure 3:
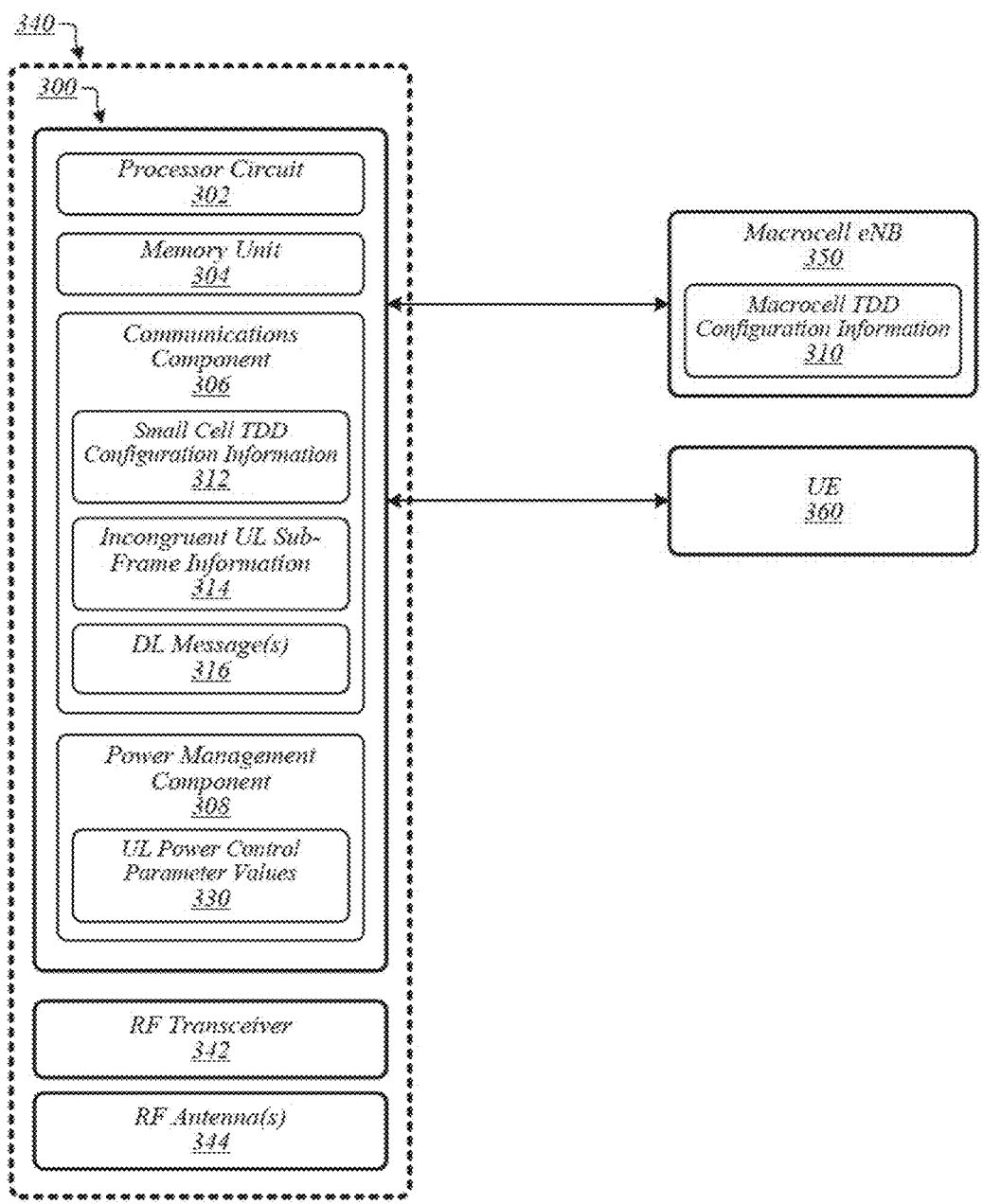
FIG. 3 illustrates an embodiment of a first apparatus and an embodiment of a first system.

FIG. 3 illustrates a block diagram of an apparatus 300. Apparatus 300 may be representative of an eNB, such as eNB 108 of FIG. 1, that may implement adjacent channel interference mitigation techniques in some embodiments. As shown in FIG. 3, apparatus 300 comprises multiple elements including a processor circuit 302, a memory unit 304, a communications component 306, and a power management component 308. The embodiments, however, are not limited to the type, number, or arrangement of elements shown in this figure.

In various embodiments, apparatus 300 may comprise processor circuit 302. Processor circuit 302 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 302 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 302 may be implemented as a general purpose processor, such as a processor made by Intel® Corporation, Santa Clara, Calif. The embodiments are not limited in this context.

In some embodiments, apparatus 300 may comprise or be arranged to communicatively couple with a memory unit 304. Memory unit 304 may be implemented using any machine-readable or computer-readable media capable of storing data, including both volatile and non-volatile memory. For example, memory unit 304 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 304 may be included on the same integrated circuit as processor circuit 302, or alternatively some portion or all of memory unit 304 may be disposed on an integrated circuit or other medium, for example a hard disk drive, that is external to the integrated circuit of processor circuit 302. Although memory unit 304 is comprised within apparatus 300 in FIG. 3, memory unit 304 may be external to apparatus 300 in various embodiments. The embodiments are not limited in this context.

In some embodiments, apparatus 300 may comprise a communications component 306. Communications component 306 may comprise logic, circuitry, and/or instructions operative to send messages to one or more remote devices and/or to receive messages from one or more remote devices. In various embodiments, communications component 306 may be operative to send and/or receive messages over one or more wired connections, one or more wireless connections, or a combination of both. In some embodiments, communications component 306 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In various embodiments, apparatus 300 may comprise a power management component 308. Power management component 308 may comprise logic, circuitry, and/or instructions operative to determine transmit powers for messages sent by communications component 306. In some embodiments, power management component 308 may be operative to determine such transmit powers based on information received from one or more remote devices. In various embodiments, power management component 308 may additionally or alternatively be operative to determine transmit powers to be used by one or more remote devices in sending messages to apparatus 300. The embodiments are not limited in this context.

FIG. 3 also illustrates a block diagram of a system 340. System 340 may comprise any of the aforementioned elements of apparatus 300. System 340 may further comprise a radio frequency (RF) transceiver 342. RF transceiver 342 may comprise one or more radios capable of transmitting and receiving signals using various suitable wireless communications techniques. Such techniques may involve communications across one or more wireless networks. Exemplary wireless networks include (but are not limited to) cellular radio access networks, wireless local area networks (WLANs), wireless personal area networks (WPANs), wireless metropolitan area network (WMANs), and satellite networks. In communicating across such networks, RF transceiver 342 may operate in accordance with one or more applicable standards in any version. The embodiments are not limited in this context.

In some embodiments, system 340 may comprise one or more RF antennas 344. Examples of any particular RF antenna 344 may include, without limitation, an internal antenna, an omni-directional antenna, a monopole antenna, a dipole antenna, an end-fed antenna, a circularly polarized antenna, a micro-strip antenna, a diversity antenna, a dual antenna, a tri-band antenna, a quad-band antenna, and so forth. In various embodiments, RF transceiver 342 may be operative to send and/or receive messages and/or data using one or more RF antennas 344. The embodiments are not limited in this context.

During operation, apparatus 300 and/or system 340 may generally be operative to implement a radio access network cell within which it provides service to one or more remote devices such as UEs. In some embodiments, apparatus 300 and/or system 340 may comprise an eNB that serves UEs within a small cell, such as a picocell. In various embodiments, apparatus 300 and/or system 340 may be operative to communicate with UEs in the small cell according to a TDD configuration for the small cell. In some embodiments, the small cell that apparatus 300 and/or system 340 serves may be located within or near a macrocell that operates on an adjacent frequency channel. In various embodiments, apparatus 300 and/or system 340 may be operative to communicate with a macrocell eNB 350 that serves the macrocell. The embodiments are not limited in this context.

In some embodiments, communications component 306 may be operative to receive macrocell TDD configuration information 310 from macrocell eNB 350. Macrocell TDD configuration information 310 may comprise information describing a TDD configuration according to which macrocell eNB 350 communicates with UEs in its macrocell. In various embodiments, macrocell TDD configuration information 310 may comprise an identifier (ID) for a particular TDD configuration, the details of which may already known to apparatus 300 and/or system 340. For example, in some embodiments, memory unit 304 may comprised stored information describing various possible TDD configurations and specifying their respective IDs. In various other embodiments, macrocell TDD configuration information 310 may comprise information that in itself specifies the details of a TDD configuration of the macrocell. For example, in some embodiments, macrocell TDD configuration information 310 may specify, for each sub-frame of a defined wireless communications timing frame, whether communications performed in the macrocell during that sub-frame are performed in the UL direction, the DL direction, or both. In various embodiments, the TDD configuration of the macrocell may be static. The embodiments are not limited in this context.

In some embodiments, power management component 308 may be operative to determine a TDD configuration for a small cell served by apparatus 300 and/or system 340. In various embodiments, the TDD configuration for the small cell may be dynamically selected, based on traffic characteristics in the small cell. For example, in some embodiments, if there is a significantly larger amount of DL traffic in the small cell than there is UL traffic, a TDD configuration may be selected for the small cell that allocated more sub-frames for DL communications than it allocates for UL communications. In various embodiments, power management component 308 and/or one or more other components of apparatus 300 and/or system 340 may select the TDD configuration for the small cell. In some other embodiments, the TDD configuration for the small cell may be selected by an external device and reported to apparatus 300 and/or system 340. For example, in various embodiments, communications component 306 may be operative to send traffic information to macrocell eNB 350 that describes the traffic in the small cell, and macrocell eNB 350 may be operative to select the TDD configuration for the small cell and send a message to apparatus 300 and/or system 340 that comprises an ID for the selected TDD configuration. Power management component 308 may then be operative to determine the TDD configuration for the small cell based on the ID comprised in the received message. The embodiments are not limited to this example.

In some embodiments, power management component 308 may be operative to identify one or more incongruent sub-frames of a small cell served by apparatus 300 and/or system 340. Herein, the term "incongruent sub-frame" denotes a sub-frame during at least a portion of which a communications direction in a small cell is different than a communications direction in an adjacent-channel macrocell within or near which the small cell is located. An "incongruent UL sub-frame" is defined as a sub-frame during which communications are in the UL direction in the small cell but, during at least a portion of the sub-frame, are in the DL direction in the adjacent-channel macrocell. Similarly, an "incongruent DL sub-frame" is defined as a sub-frame during which communications are in the DL direction in the small cell but, during at least a portion of the sub-frame, are in the UL direction in the adjacent-channel macrocell. In various embodiments, the incongruent sub-frames identified by power management component 308 may include one or more incongruent UL sub-frames and/or one or more incongruent DL sub-frames. In some embodiments, power management component 308 may be operative to determine the one or more incongruent sub-frames by comparing the TDD configuration of the macrocell with the TDD configuration of the small cell. The embodiments are not limited in this context.

In various embodiments, in response to identifying one or more incongruent DL sub-frames, power management component 308 may be operative to select a reduced DL transmit power for use in transmitting DL messages 316 sent during those sub-frames. In some embodiments, power management component 308 may be operative to determine the reduced DL transmit power by reducing a standard DL transmit power by a particular margin. For example, in various embodiments, power management component 308 may be operative to determine the reduced DL transmit power by subtracting 10 dB from a standard DL transmit power. The embodiments are not limited to this example.

In some embodiments, communications component 306 may be operative to use the reduced DL transmit power to send one or more DL messages 316 during one or more of the incongruent DL sub-frames. In various embodiments, by reducing the transmit power with which it sends DL messages 316 during incongruent DL sub-frames, communications component 306 may reduce the tendency of those DL messages 316 to interfere with UL communications sent to macrocell eNB 350 by UEs in the macrocell that macrocell eNB 350 serves. The embodiments are not limited in this context.

In some embodiments, communications component 306 may be operative to send small cell TDD configuration information 312 to one or more small cell UEs, such as a UE 360. Small cell TDD configuration information 312 may comprise information describing the selected TDD configuration according to which UEs in the small cell are to communicate with apparatus 300 and/or system 340. In various embodiments, small cell TDD configuration information 312 may simply comprise a TDD configuration ID, while in some other embodiments, small cell TDD configuration information 312 may comprise information that in itself specifies the details of the selected TDD configuration for the small cell. The embodiments are not limited in this context.

In various embodiments, communications component 306 may be operative to provide the one or more small cell UEs with additional information that they can use to implement further interference mitigation techniques. More particularly, in some embodiments, communications component 306 may be operative to send information that enables one or more small cell UEs to identify one or more incongruent UL sub-frames and perform interference mitigation techniques during those incongruent UL sub-frames. For example, in various embodiments, communications component 306 may be operative to provide one or more UEs such as UE 360 with incongruent UL sub-frame information 314 that identifies one or more incongruent UL sub-frames for the small cell. In some other embodiments, communications component 306 may be operative to provide the one or more UEs with macrocell TDD configuration information 310 and small cell TDD configuration information 312, and those UEs may be operative to identify the one or more incongruent UL sub-frames based on the macrocell TDD configuration information 310 and the small cell TDD configuration information 312. In yet other embodiments, the UEs may be operative to receive macrocell TDD configuration information 310 directly from macrocell eNB 350, to receive small cell TDD configuration information 312 from apparatus 300 and/or system 340, and to identify the one or more incongruent UL sub-frames based on the macrocell TDD configuration information 310 and the small cell TDD configuration information 312. The embodiments are not limited in this context.

In some embodiments, power management component 308 may be operative to select one or more UL power control parameter values 330 for application by one or more small cell UEs, such as UE 360. In various embodiments, communications component 306 may be operative to send UL power control parameter values 330 to small cell UEs by including UL power control parameter values 330 in incongruent UL sub-frame information 314 and or DL messages 316. In some other embodiments, communications component 306 may be operative to send UL power control parameter values 330 in separate, dedicated messages. In various embodiments, UL power control parameter values 330 may comprise values for UL power control parameters that small cell UEs are to apply in order to implement enhanced UL transmit powers during incongruent UL sub-frames. The embodiments are not limited in this context.

Figure 4:
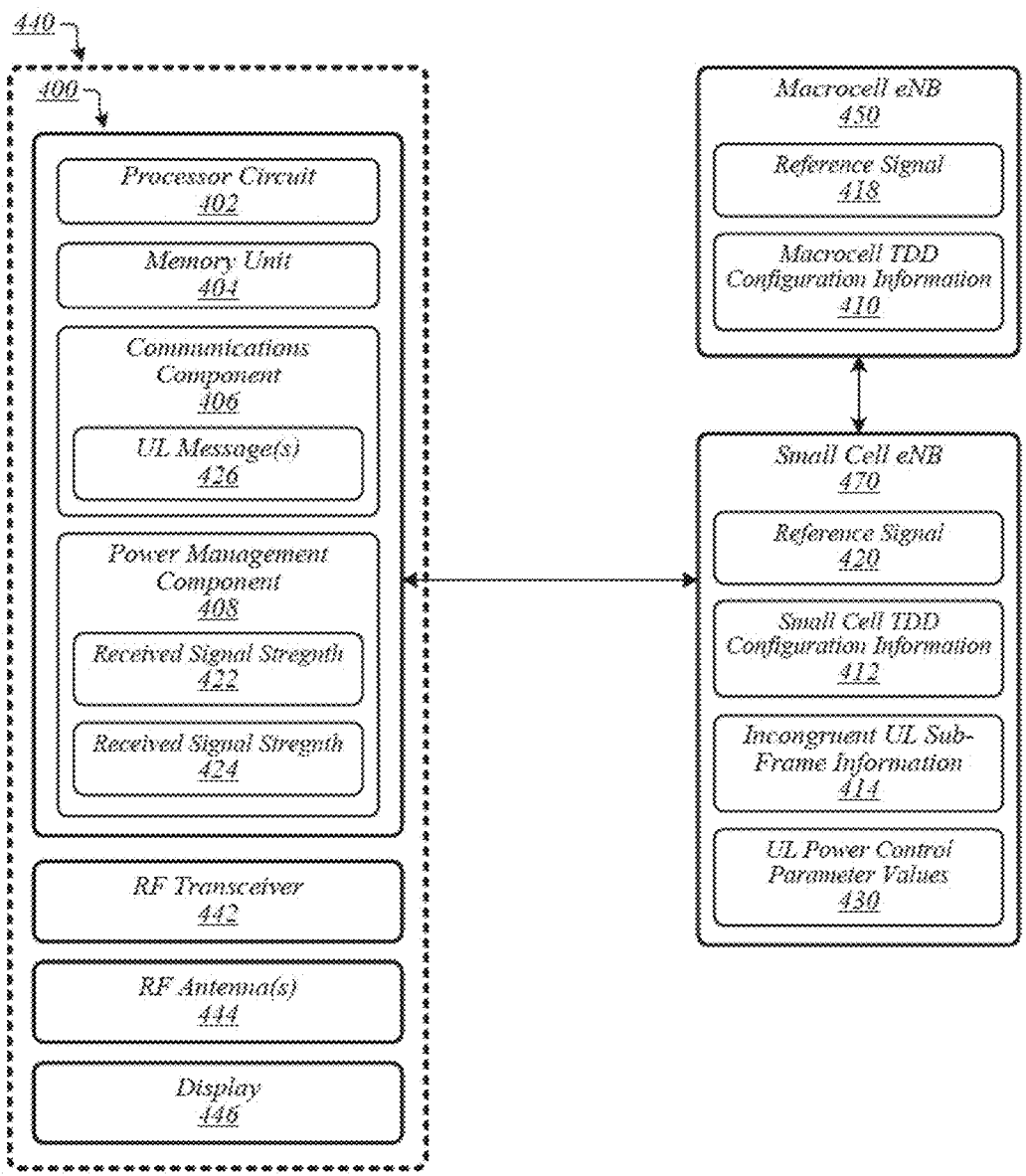
FIG. 4 illustrates an embodiment of a second apparatus and an embodiment of a second system.

FIG. 4 illustrates a block diagram of an apparatus 400. Apparatus 400 may be representative of a UE, such as a UE 110 of FIG. 1 and/or UE 360 of FIG. 3, that may implement adjacent channel interference mitigation techniques in various embodiments. As shown in FIG. 4, apparatus 400 comprises multiple elements including a processor circuit 402, a memory unit 404, a communications component 406, and a power management component 408. The embodiments, however, are not limited to the type, number, or arrangement of elements shown in this figure.

In some embodiments, apparatus 400 may comprise processor circuit 402. Processor circuit 402 may be implemented using any processor or logic device. Examples of processor circuit 402 may include, without limitation, any of the examples previously presented with respect to processor circuit 302 of FIG. 3. The embodiments are not limited in this context.

In various embodiments, apparatus 400 may comprise or be arranged to communicatively couple with a memory unit 404. Memory unit 404 may be implemented using any machine-readable or computer-readable media capable of storing data, including both volatile and non-volatile memory. Examples of memory unit 404 may include, without limitation, any of the examples previously presented with respect to memory unit 304 of FIG. 3. It is worthy of note that some portion or all of memory unit 404 may be included on the same integrated circuit as processor circuit 402, or alternatively some portion or all of memory unit 404 may be disposed on an integrated circuit or other medium, for example a hard disk drive, that is external to the integrated circuit of processor circuit 402. Although memory unit 404 is comprised within apparatus 400 in FIG. 4, memory unit 404 may be external to apparatus 400 in some embodiments. The embodiments are not limited in this context.

In various embodiments, apparatus 400 may comprise a communications component 406. Communications component 406 may comprise logic, circuitry, and/or instructions operative to send messages to one or more remote devices and/or to receive messages from one or more remote devices. In some embodiments, communications component 406 may be operative to send and/or receive messages over one or more wired connections, one or more wireless connections, or a combination of both. In various embodiments, communications component 406 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In some embodiments, apparatus 400 may comprise a power management component 408. Power management component 408 may comprise logic, circuitry, and/or instructions operative to determine transmit powers for messages sent by communications component 406. In various embodiments, power management component 408 may be operative to determine such transmit powers based on information received from one or more remote devices. In some embodiments, power management component 408 may additionally be operative to determine received signal strengths for one or more signals received from one or more remote devices. The embodiments are not limited in this context.

FIG. 4 also illustrates a block diagram of a system 440. System 440 may comprise any of the aforementioned elements of apparatus 400. System 440 may further comprise an RF transceiver 442. RF transceiver 442 may comprise one or more radios capable of transmitting and receiving signals using various suitable wireless communications techniques. Such techniques may involve communications across one or more wireless networks. Examples of such wireless networks may include, without limitation, any of the examples previously presented with respect to RF transceiver 342 of FIG. 3. In communicating across such networks, RF transceiver 442 may operate in accordance with one or more applicable standards in any version. The embodiments are not limited in this context.

In various embodiments, system 440 may comprise one or more RF antennas 444. Examples of RF antenna(s) 444 may include, without limitation, any of the examples previously presented with respect to RF antenna(s) 344 of FIG. 3. In various embodiments, RF transceiver 442 may be operative to send and/or receive messages and/or data using one or more RF antennas 444. The embodiments are not limited in this context.

In some embodiments, system 440 may comprise a display 446. Display 446 may comprise any display device capable of displaying information received from processor circuit 402. Examples for display 446 may include a television, a monitor, a projector, and a computer screen. In one embodiment, for example, display 446 may be implemented by a liquid crystal display (LCD), light emitting diode (LED) or other type of suitable visual interface. Display 446 may comprise, for example, a touch-sensitive display screen ("touchscreen"). In various implementations, display 446 may comprise one or more thin-film transistors (TFT) LCD including embedded transistors. The embodiments, however, are not limited to these examples.

During operation, apparatus 400 and/or system 440 may generally be operative to detect one or more eNBs based on reference signals received from the one or more eNBs, associate with a selected one of the one or more eNBs, and obtain wireless connectivity via the selected eNB. In some embodiments, apparatus 400 and/or system 440 may be operative to select the eNB with which it associates based on the respective signal strengths with which it receives the reference signals from the one or more eNBs. In various embodiments, apparatus 400 and/or system 440 may implement an eNB selection procedure that features an adjacent channel association bias. In some embodiments in which apparatus 400 and/or system 440 selects between a macrocell eNB and a small cell eNB that operate on adjacent frequency channels, the adjacent channel association bias may increase the tendency of apparatus 400 and/or system 440 to select the small cell eNB. The embodiments are not limited in this context.

In various embodiments, communications component 406 may be operative to receive a reference signal 418 from a macrocell eNB 450, which may be the same as or similar to eNB 102 of FIG. 1 and/or macrocell eNB 350 of FIG. 3. In some embodiments, communications component 406 may be operative to receive a reference signal 420 from a small cell eNB 470, which may operate on frequency channel that is adjacent to that used by the macrocell eNB 450, and which may be the same as or similar to eNB 108 of FIG. 1 and/or apparatus 300 and/or system 340 of FIG. 3. In various embodiments, reference signals 418 and 420 may comprise channel state information (CSI) reference signals. In some embodiments, power management component 408 may be operative to determine a received signal strength 422 for reference signal 418 and a received signal strength 424 for reference signal 420. In various embodiments, received signal strengths 422 and 424 may comprise respective powers with which apparatus 400 and/or system 440 receive reference signals 418 and 420. The embodiments are not limited in this context.

In some embodiments, having detected macrocell eNB 450 and small cell eNB 470 based on respective reference signals 418 and 420, power management component 408 may be operative to determine whether to associate with macrocell eNB 450 or to associate with small cell eNB 470.

More particularly, in various embodiments, power management component 408 may be operative to select between macrocell eNB 450 and small cell eNB 470 based on received signal strengths 422 and 424. In some embodiments, power management component 408 may be operative simply to compare received signal strength 422 with received signal strength 424, and select the eNB corresponding to the greater of the two received signal strengths. However, in various other embodiments, power management component 408 may be operative to determine that macrocell eNB 450 and small cell eNB 470 operate on adjacent frequency channels, and may be operative to apply an adjacent channel association bias to its eNB selection procedure. In some such embodiments, power management component 408 may be operative to apply the adjacent channel association bias by incrementing received signal strength 424 by some amount, such as 15 dB, before comparing it with received signal strength 422. It will be appreciated that numerous other approaches may be used in order to implement an adjacent channel association bias during selection between eNBs, and the embodiments are not limited to this example.

In various embodiments, power management component 408 may be operative to select small cell eNB 470 for association. In some embodiments, apparatus 400 and/or system 440 may be operative to communicate with small cell eNB 470 according to a TDD configuration for the small cell. In various embodiments, communications component 406 may be operative to receive small cell TDD configuration information 412 from small cell eNB 470 that describes the TDD configuration for the small cell. In some embodiments, small cell TDD configuration information 412 may simply comprise a TDD configuration ID, while in various other embodiments, small cell TDD configuration information 412 may comprise information that in itself specifies the details of the TDD configuration for the small cell. The embodiments are not limited in this context.

In some embodiments, power management component 408 may be operative to identify one or more incongruent UL sub-frames for the small cell. In various embodiments, power management component 408 may be operative to identify the one or more incongruent UL sub-frames based on information received from small cell eNB 470. In some embodiments, communications component 406 may be operative to receive incongruent UL sub-frame information 414 from small cell eNB 470 that specifies one or more incongruent UL-sub-frames, and power management component 408 may be operative to identify the one or more incongruent UL sub-frames based on the incongruent UL sub-frame information 414. In various other embodiments, communications component 406 may be operative to macrocell TDD configuration information 410 from small cell eNB 470 that describes a TDD configuration for a macrocell within or near which the small cell is located, and power management component 408 may be operative to identify the one or more incongruent UL sub-frames based on the macrocell TDD configuration information 410 and the small cell TDD configuration information 412. In yet other embodiments, communications component 406 may be operative to receive macrocell TDD configuration information 410 directly from macrocell eNB 450, to receive small cell TDD configuration information 412 from small cell eNB 470, and to identify the one or more incongruent UL sub-frames based on the macrocell TDD configuration information 410 and the small cell TDD configuration information 412. The embodiments are not limited in this context.

In some embodiments, in response to identifying one or more incongruent UL sub-frames, power management component 408 may be operative to implement an enhanced UL transmit power for use in transmitting UL messages 426 sent during those sub-frames. In various embodiments, power management component 408 may be operative to apply one or more UL power control parameter values in order to implement the enhanced UL transmit power. In some embodiments, communications component 406 may be operative to receive UL power control parameter values 430 from small cell eNB 470, and power management component 408 may be operative to apply the received UL power control parameter values 430 in order to implement the enhanced UL transmit power.

In some embodiments, the UL power control parameter values may comprise values for fractional UL power control parameters. In various embodiments, for example, power management component 408 may be operative to apply values for a target received power parameter $P_0$ and/or a compensation factor parameter $\alpha$ in order to implement an enhanced UL transmit power for sending UL messages 426 during one or more incongruent UL sub-frames. In an example embodiment, power management component 408 may be operative to increment the target received power parameter $P_0$ by a defined margin, such as 10 dB. In some embodiments, communications component 406 may be operative to use the enhanced UL transmit power to send one or more UL messages 418 to small cell eNB 470 during one or more of the incongruent UL sub-frames. In various embodiments, by increasing the transmit power with which it sends UL messages 426 during incongruent UL sub-frames, communications component 406 may reduce the tendency of DL transmissions of a surrounding or neighboring macrocell to interfere with those UL messages 426. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 5:
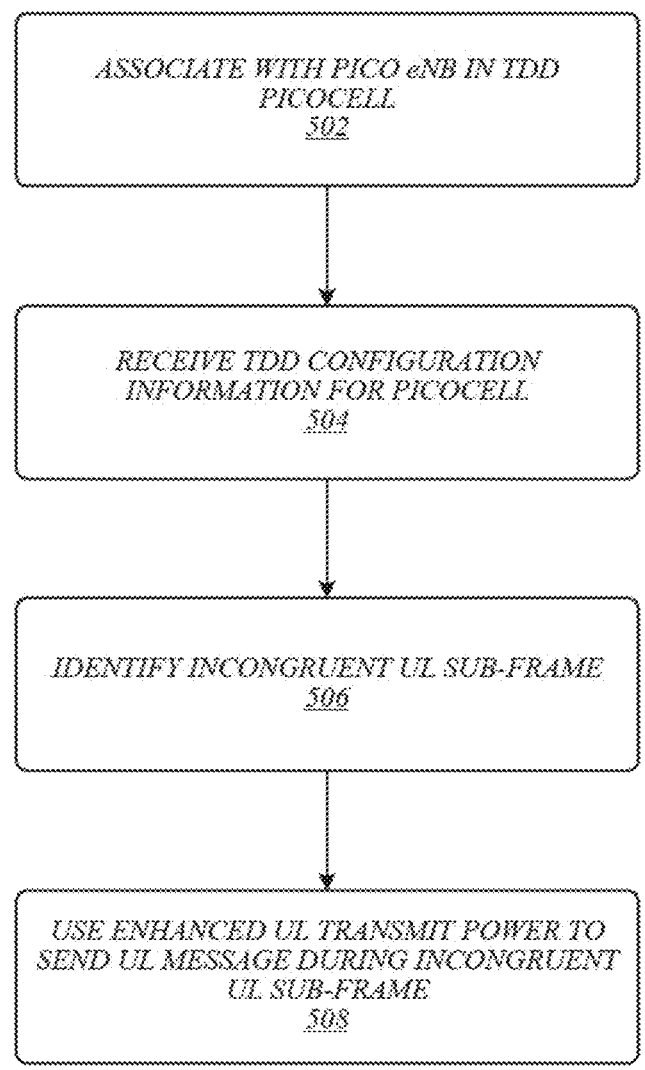
FIG. 5 illustrates an embodiment of a first logic flow.

FIG. 5 illustrates one embodiment of a logic flow 500, which may be representative of the operations executed by one or more embodiments described herein. More particularly, logic flow 500 may be representative of operations that may be performed in some embodiments by a small cell UE, such as a UE 110 of FIG. 1, UE 360 of FIG. 3, and/or apparatus 400 and/or system 440 of FIG. 4. As shown in logic flow 500, association with a pico eNB in a TDD picocell may be performed at 502. For example, apparatus 400 and/or system 440 of FIG. 4 may be operative to associate with small cell eNB 470, which may comprise a pico eNB in a TDD picocell. At 504, TDD configuration information for the picocell may be received. For example, communications component 406 of FIG. 4 may be operative to receive small cell TDD configuration information 412. At 506, an incongruent UL sub-frame may be identified. For example, power management component 408 of FIG. 4 may be operative to identify one or more incongruent UL sub-frames based on small cell TDD configuration information

412. At 508, an enhanced UL transmit power may be used to send a UL message during the incongruent UL sub-frame. For example, communications component 406 of FIG. 4 may be operative to use an enhanced UL transmit power to send a UL message 426 during an incongruent UL sub-frame. The embodiments are not limited to these examples.

Figure 6:
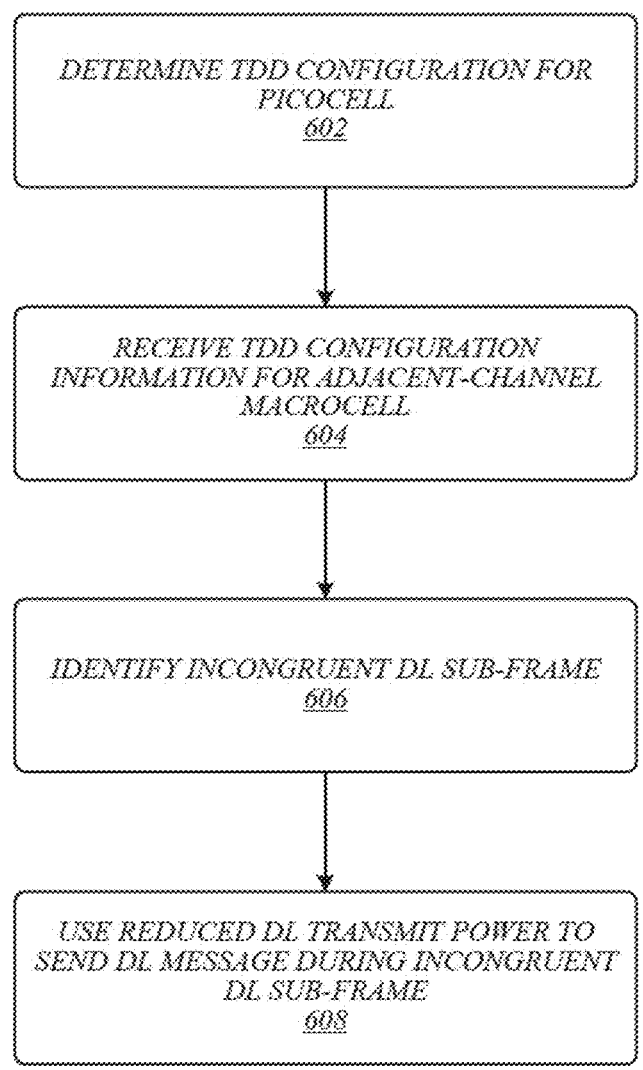
FIG. 6 illustrates an embodiment of a second logic flow.

FIG. 6 illustrates one embodiment of a logic flow 600, which may be representative of the operations executed by one or more embodiments described herein. More particularly, logic flow 600 may be representative of operations that may be performed in various embodiments by a small cell eNB, such as eNB 108 of FIG. 1, apparatus 300 and/or system 340 of FIG. 3, and/or small cell eNB 470 of FIG. 4. As shown in logic flow 600, a TDD configuration for a picocell may be determined at 602. For example, power management component 308 of FIG. 3 may be operative to determine a TDD configuration for a picocell served by apparatus 300 and/or system 340. At 604, TDD configuration for an adjacent-channel macrocell may be received. For example, communications component 306 of FIG. 3 may be operative to receive macrocell TDD configuration information 310 from macrocell eNB 350, which may serve an adjacent-channel macrocell. At 606, an incongruent DL sub-frame may be identified. For example, power management component 308 of FIG. 3 may be operative to identify an incongruent DL sub-frame based on macrocell TDD configuration information 310 and small cell TDD configuration information 312. At 608, a reduced DL transmit power may be used to send a DL message during the incongruent DL sub-frame. For example, communications component 306 of FIG. 3 may be operative to use a reduced DL transmit power to send a DL message 316 during the incongruent DL sub-frame. The embodiments are not limited to these examples.

Figure 7:
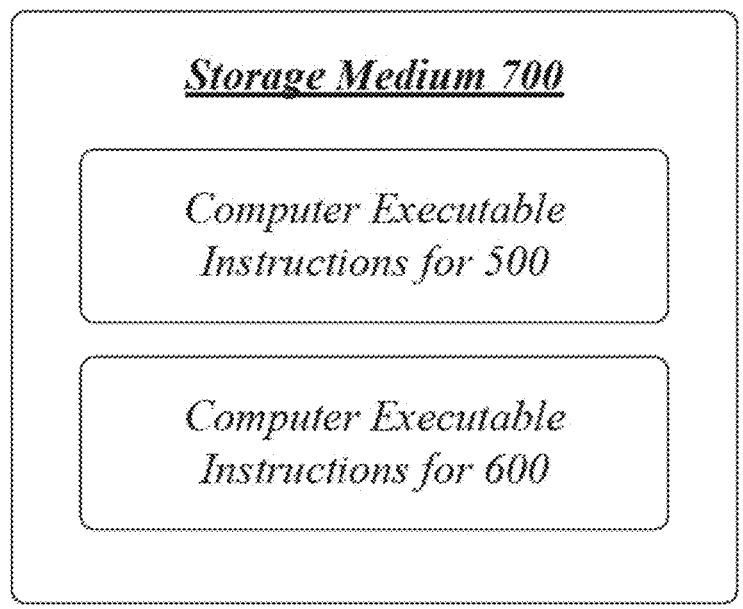
FIG. 7 illustrates an embodiment of a storage medium.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions, such as computer-executable instructions to implement one or more of logic flow 500 of FIG. 5 and logic flow 600 of FIG. 6. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
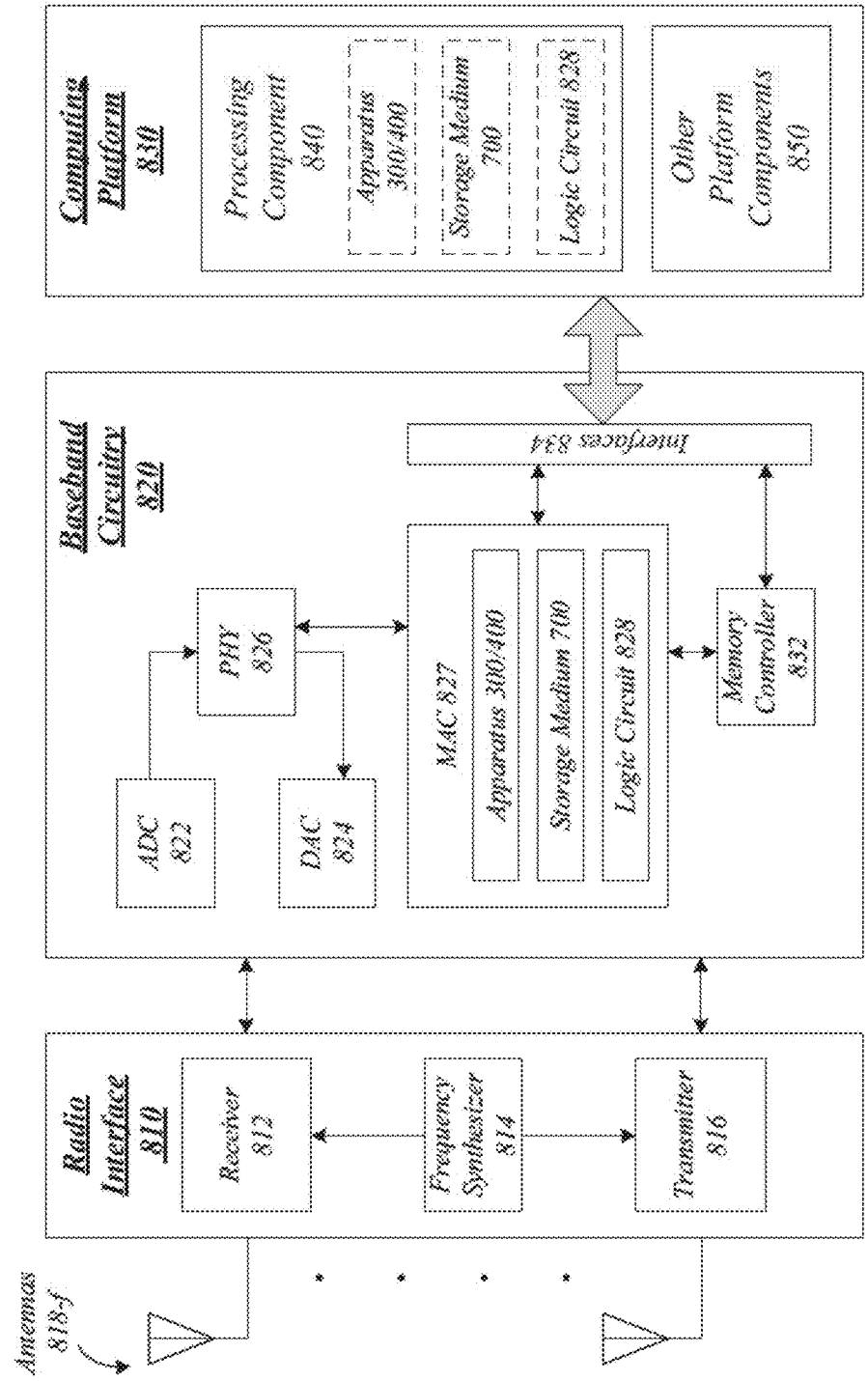
FIG. 8 illustrates an embodiment of a device.

FIG. 8 illustrates an embodiment of a communications device 800 that may implement one or more of apparatus 300 and/or system 340 of FIG. 3, apparatus 400 and/or system 440 of FIG. 4, logic flow 500 of FIG. 5, logic flow 600 of FIG. 6, and storage medium 700 of FIG. 7. In various embodiments, device 800 may comprise a logic circuit 828. The logic circuit 828 may include physical circuits to perform operations described for one or more of apparatus 300 and/or system 340 of FIG. 3, apparatus 400 and/or system 440 of FIG. 4, logic flow 500 of FIG. 5, and logic flow 600 of FIG. 6, for example. As shown in FIG. 8, device 800 may include a radio interface 810, baseband circuitry 820, and computing platform 830, although the embodiments are not limited to this configuration.

The device 800 may implement some or all of the structure and/or operations for one or more of apparatus 300 and/or system 340 of FIG. 3, apparatus 400 and/or system 440 of FIG. 4, logic flow 500 of FIG. 5, logic flow 600 of FIG. 6, storage medium 700 of FIG. 7, and logic circuit 828 in a single computing entity, such as entirely within a single device. Alternatively, the device 800 may distribute portions of the structure and/or operations for one or more of apparatus 300 and/or system 340 of FIG. 3, apparatus 400 and/or system 440 of FIG. 4, logic flow 500 of FIG. 5, logic flow 600 of FIG. 6, storage medium 700 of FIG. 7, and logic circuit 828 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 810 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 810 may include, for example, a receiver 812, a frequency synthesizer 814, and/or a transmitter 816. Radio interface 810 may include bias controls, a crystal oscillator and/or one or more antennas 818-$f$. In another embodiment, radio interface 810 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 820 may communicate with radio interface 810 to process receive and/or transmit signals and may include, for example, an analog-to-digital converter 822 for down converting received signals, a digital-to-analog converter 824 for up converting signals for transmission. Further, baseband circuitry 820 may include a baseband or physical layer (PHY) processing circuit 826 for PHY link layer processing of respective receive/transmit signals. Baseband circuitry 820 may include, for example, a medium access control (MAC) processing circuit 827 for MAC/data link layer processing. Baseband circuitry 820 may include a memory controller 832 for communicating with MAC processing circuit 827 and/or a computing platform 830, for example, via one or more interfaces 834.

In some embodiments, PHY processing circuit 826 may include a frame construction and/or detection module, in combination with additional circuitry such as a buffer memory, to construct and/or deconstruct communication frames. Alternatively or in addition, MAC processing circuit 827 may share processing for certain of these functions or perform these processes independent of PHY processing circuit 826. In some embodiments, MAC and PHY processing may be integrated into a single circuit.

The computing platform 830 may provide computing functionality for the device 800. As shown, the computing platform 830 may include a processing component 840. In addition to, or alternatively of, the baseband circuitry 820, the device 800 may execute processing operations or logic for one or more of apparatus 300 and/or system 340 of FIG. 3, apparatus 400 and/or system 440 of FIG. 4, logic flow 500 of FIG. 5, logic flow 600 of FIG. 6, storage medium 700 of FIG. 7, and logic circuit 828 using the processing component 840. The processing component 840 (and/or PHY 826 and/or MAC 827) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 830 may further include other platform components 850. Other platform components 850 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 800 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 800 described herein, may be included or omitted in various embodiments of device 800, as suitably desired.

Embodiments of device 800 may be implemented using single input single output (SISO) architectures. However, certain implementations may include multiple antennas (e.g., antennas 818-f) for transmission and/or reception using adaptive antenna techniques for beamforming or spatial division multiple access (SDMA) and/or using MIMO communication techniques.

The components and features of device 800 may be implemented using any combination of discrete circuitry, application specific integrated circuits (ASICs), logic gates and/or single chip architectures. Further, the features of device 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

FIG. 9 illustrates an embodiment of a broadband wireless access system 900. As shown in FIG. 9, broadband wireless access system 900 may be an internet protocol (IP) type network comprising an internet 910 type network or the like that is capable of supporting mobile wireless access and/or fixed wireless access to internet 910. In one or more embodiments, broadband wireless access system 900 may comprise any type of orthogonal frequency division multiple access (OFDMA) based wireless network, such as a system compliant with one or more of the 3GPP LTE Specifications and/or IEEE 802.16 Standards, and the scope of the claimed subject matter is not limited in these respects.

In the exemplary broadband wireless access system 900, radio access networks (RANs) 912 and 918 are capable of coupling with evolved node Bs (eNBs) 914 and 920, respectively, to provide wireless communication between one or more fixed devices 916 and internet 910 and/or between or one or more mobile devices 922 and Internet 910. One example of a fixed device 916 and a mobile device 922 is device 800 of FIG. 8, with the fixed device 916 comprising a stationary version of device 800 and the mobile device 922 comprising a mobile version of device 800. RANs 912 and 918 may implement profiles that are capable of defining the mapping of network functions to one or more physical entities on broadband wireless access system 900. eNBs 914 and 920 may comprise radio equipment to provide RF communication with fixed device 916 and/or mobile device 922, such as described with reference to device 800, and may comprise, for example, the PHY and MAC layer equipment in compliance with a 3GPP LTE Specification or an IEEE 802.16 Standard. eNBs 914 and 920 may further comprise an IP backplane to couple to Internet 910 via RANs 912 and 918, respectively, although the scope of the claimed subject matter is not limited in these respects.

Broadband wireless access system 900 may further comprise a visited core network (CN) 924 and/or a home CN 726, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 924 and/or home CN 926, and the scope of the claimed subject matter is not limited in these respects. Visited CN 924 may be referred to as a visited CN in the case where visited CN 924 is not part of the regular service provider of fixed device 916 or mobile device 922, for example where fixed device 916 or mobile device 922 is roaming away from its respective home CN 926, or where broadband wireless access system 900 is part of the regular service provider of fixed device 916 or mobile device 922 but where broadband wireless access system 900 may be in another location or state that is not the main or home location of fixed device 916 or mobile device 922. The embodiments are not limited in this context.

Fixed device 916 may be located anywhere within range of one or both of eNBs 914 and 920, such as in or near a home or business to provide home or business customer broadband access to Internet 910 via eNBs 914 and 920 and RANs 912 and 918, respectively, and home CN 926. It is worthy of note that although fixed device 916 is generally disposed in a stationary location, it may be moved to different locations as needed. Mobile device 922 may be utilized at one or more locations if mobile device 922 is within range of one or both of eNBs 914 and 920, for example. In accordance with one or more embodiments, operation support system (OSS) 928 may be part of broadband wireless access system 900 to provide management functions for broadband wireless access system 900 and to provide interfaces between functional entities of broadband wireless access system 900. Broadband wireless access system 900 of FIG. 9 is merely one type of wireless network showing a certain number of the components of broadband wireless access system 900, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is user equipment (UE), comprising logic, at least a portion of which is in hardware, the logic to associate the UE with a pico evolved node B (eNB) in a time-division duplex (TDD) picocell, identify an incongruent uplink (UL) sub-frame for the picocell, and implement an enhanced UL transmit power for the incongruent UL sub-frame.

In Example 2, the logic of Example 1 may optionally use the enhanced UL transmit power to send a UL message during the incongruent UL sub-frame.

In Example 3, the logic of any of Examples 1 to 2 may optionally configure one or more UL power control parameters in order to implement the enhanced UL transmit power.

In Example 4, the one or more UL power control parameters of Example 3 may optionally comprise at least one fractional UL power control parameter.

In Example 5, the one or more UL power control parameters of any of Examples 3 to 4 may optionally comprise a target received power parameter $P_O$.

In Example 6, the logic of Example 5 may optionally increment the target received power parameter $P_O$ by a defined margin, based on a received UL power control parameter value.

In Example 7, the one or more UL power control parameters of any of Examples 3 to 6 may optionally comprise a compensation factor α.

In Example 8, the logic of any of Examples 1 to 7 may optionally identify the incongruent UL sub-frame based on received incongruent UL sub-frame information.

In Example 9, the logic of any of Examples 1 to 8 may optionally identify the incongruent UL sub-frame based on received TDD configuration information.

In Example 10, the logic of any of Examples 1 to 9 may optionally associate the UE with the pico eNB based on an adjacent channel association bias.

Example 11 is the UE of any of Examples 1 to 10, comprising a radio frequency (RF) transceiver, one or more RF antennas, and a display.

Example 12 is at least one non-transitory computer-readable storage medium, comprising a set of wireless communication instructions that, in response to being executed on a computing device, cause the computing device to receive a small cell evolved node B (eNB) reference signal and an adjacent-channel macrocell eNB reference signal, associate with an eNB of a time-division duplex (TDD) small cell, based on a received signal strength of the small cell eNB reference signal, a received signal strength of the adjacent-channel macrocell eNB reference signal, and an adjacent channel association bias, and identify an incongruent uplink (UL) sub-frame for the TDD small cell.

In Example 13, the at least one non-transitory computer-readable storage medium of Example 12 may optionally comprise wireless communication instructions that, in response to being executed on the computing device, cause the computing device to increase a UL transmit power during the incongruent UL sub-frame.

In Example 14, the at least one non-transitory computer-readable storage medium of Example 13 may optionally comprise wireless communication instructions that, in response to being executed on the computing device, cause the computing device to send a UL transmission using the increased UL transmit power during the incongruent UL subframe.

In Example 15, the at least one non-transitory computer-readable storage medium of any of Examples 12 to 14 may optionally comprise wireless communication instructions that, in response to being executed on the computing device, cause the computing device to identify the incongruent UL sub-frame based on TDD configuration information for the TDD small cell.

In Example 16, the at least one non-transitory computer-readable storage medium of Example 15 may optionally comprise wireless communication instructions that, in response to being executed on the computing device, cause the computing device to receive the adjacent-channel macrocell eNB reference signal from an eNB of a TDD macrocell, and identify the incongruent UL sub-frame based on the TDD configuration for the TDD small cell and on TDD configuration information for the TDD macrocell.

In Example 17, the at least one non-transitory computer-readable storage medium of any of Examples 13 to 16 may optionally comprise wireless communication instructions that, in response to being executed on the computing device, cause the computing device to modify at least one UL power control parameter in order to increase the UL transmit power.

In Example 18, the at least one non-transitory computer-readable storage medium of Example 17 may optionally comprise wireless communication instructions that, in response to being executed on the computing device, cause the computing device to modify the at least one UL power control parameter in response to at least one received UL power control parameter value.

In Example 19, the at least one non-transitory computer-readable storage medium of Example 18 may optionally comprise wireless communication instructions that, in response to being executed on the computing device, cause the computing device to receive the at least one received UL power control parameter value from the eNB of the TDD small cell.

In Example 20, the at least one UL power control parameter of any of Examples 13 to 19 may optionally comprise one or more fractional power control parameters.

In Example 21, the one or more fractional power control parameters of Example 20 may optionally comprise one or both of a target received power $P_0$ and a compensation factor α.

Example 22 is a wireless communication method, comprising determining, by a processor circuit at a pico evolved node B (eNB), a TDD configuration for a picocell, receiving macrocell configuration information specifying a TDD configuration of an adjacent-channel macrocell, and identifying an incongruent downlink (DL) sub-frame by comparing the TDD configuration of the macrocell with the TDD configuration of the picocell.

In Example 23, the wireless communication method of Example 22 may optionally comprise using a reduced transmit power to send a DL message during the incongruent DL sub-frame.

In Example 24, the wireless communication method of Example 23 may optionally comprise determining the reduced transmit power by decrementing a standard transmit power by a defined margin.

In Example 25, the wireless communication method of any of Examples 22 to 24 may optionally comprise receiving the macrocell configuration information from a macro eNB of the adjacent-channel macrocell.

In Example 26, the wireless communication method of any of Examples 22 to 25 may optionally comprise selecting the TDD configuration for the picocell based on traffic conditions within the picocell.

In Example 27, the incongruent DL sub-frame of any of Examples 22 to 26 may optionally correspond to an uplink (UL) sub-frame of the adjacent-channel macrocell.

In Example 28, the incongruent DL sub-frame of any of Examples 22 to 26 may optionally correspond to a special sub-frame of the adjacent-channel macrocell.

In Example 29, the wireless communication method of any of Examples 22 to 28 may optionally comprise receiving the macrocell configuration information over a backhaul connection.

In Example 30, the wireless communication method of any of Examples 22 to 29 may optionally comprise sending picocell TDD configuration information over a wireless channel, and the picocell TDD configuration information may optionally identify the TDD configuration of the picocell.

In Example 31, the wireless communication method of any of Examples 22 to 30 may optionally comprise sending one or more uplink (UL) power control parameter values to be implemented in conjunction with UL transmissions in the picocell during one or more incongruent UL sub-frames.

Example 32 is at least one non-transitory computer-readable storage medium comprising a set of instructions that, in response to being executed on a computing device, cause the computing device to perform a wireless communication method according to any of Examples 22 to 31.

Example 33 is an apparatus, comprising means for performing a wireless communication method according to any of Examples 22 to 31.

Example 34 is a system, comprising an apparatus according to Example 33, a radio frequency (RF) transceiver, and one or more RF antennas.

Example 35 is user equipment (UE), comprising a processor circuit to receive a small cell evolved node B (eNB) reference signal and an adjacent-channel macrocell eNB reference signal, associate with an eNB of a time-division duplex (TDD) small cell, based on a received signal strength of the small cell eNB reference signal, a received signal strength of the adjacent-channel macrocell eNB reference signal, and an adjacent channel association bias, and identify an incongruent uplink (UL) sub-frame for the TDD small cell.

In Example 36, the processor circuit of Example 35 may optionally increase a UL transmit power during the incongruent UL sub-frame.

In Example 37, the processor circuit of Example 36 may optionally send a UL transmission using the increased UL transmit power during the incongruent UL subframe.

In Example 38, the processor circuit of any of Examples 35 to 37 may optionally identify the incongruent UL sub-frame based on TDD configuration information for the TDD small cell.

In Example 39, the processor circuit of Example 38 may optionally receive the adjacent-channel macrocell eNB reference signal from an eNB of a TDD macrocell and identify the incongruent UL sub-frame based on the TDD configuration for the TDD small cell and on TDD configuration information for the TDD macrocell.

In Example 40, the processor circuit of any of Examples 36 to 39 may optionally modify at least one UL power control parameter in order to increase the UL transmit power.

In Example 41, the processor circuit of Example 40 may optionally modify the at least one UL power control parameter in response to at least one received UL power control parameter value.

In Example 42, the processor circuit of Example 41 may optionally receive the at least one received UL power control parameter value from the eNB of the TDD small cell.

In Example 43, the at least one UL power control parameter of any of Examples 40 to 42 may optionally comprise one or more fractional power control parameters.

In Example 44, the one or more fractional power control parameters of Example 43 may optionally comprise one or both of a target received power $P_0$ and a compensation factor $\alpha$.

In Example 45 is the UE of any of Examples 35 to 44, comprising a display, a radio frequency (RF) transceiver, and one or more RF antennas.

Example 46 is at least one non-transitory computer-readable storage medium, comprising a set of wireless communication instructions that, in response to being executed on a pico evolved node B (eNB), cause the pico eNB to determine a TDD configuration for a picocell, receive macrocell configuration information specifying a TDD configuration of an adjacent-channel macrocell, and identify an incongruent downlink (DL) sub-frame by comparing the TDD configuration of the macrocell with the TDD configuration of the picocell.

In Example 47, the at least one non-transitory computer-readable storage medium of Example 46 may optionally comprise wireless communication instructions that, in response to being executed on the pico eNB, cause the pico eNB to use a reduced transmit power to send a DL message during the incongruent DL sub-frame.

In Example 48, the at least one non-transitory computer-readable storage medium of Example 47 may optionally comprise wireless communication instructions that, in response to being executed on the pico eNB, cause the pico eNB to determine the reduced transmit power by decrementing a standard transmit power by a defined margin.

In Example 49, the at least one non-transitory computer-readable storage medium of any of Examples 46 to 48 may optionally comprise wireless communication instructions that, in response to being executed on the pico eNB, cause the pico eNB to receive the macrocell configuration information from a macro eNB of the adjacent-channel macrocell.

In Example 50, the at least one non-transitory computer-readable storage medium of any of Examples 46 to 49 may optionally comprise wireless communication instructions that, in response to being executed on the pico eNB, cause the pico eNB to select the TDD configuration for the picocell based on traffic conditions within the picocell.

In Example 51, the incongruent DL sub-frame of any of Examples 46 to 50 may optionally correspond to an uplink (UL) sub-frame of the adjacent-channel macrocell.

In Example 52, the incongruent DL sub-frame of any of Examples 46 to 50 may optionally correspond to a special sub-frame of the adjacent-channel macrocell.

In Example 53, the at least one non-transitory computer-readable storage medium of any of Examples 46 to 52 may optionally comprise wireless communication instructions that, in response to being executed on the pico eNB, cause the pico eNB to receive the macrocell configuration information over a backhaul connection.

In Example 54, the at least one non-transitory computer-readable storage medium of any of Examples 46 to 53 may optionally comprise wireless communication instructions that, in response to being executed on the pico eNB, cause the pico eNB to send picocell TDD configuration information over a wireless channel, and the picocell TDD configuration information may optionally identify the TDD configuration of the picocell.

In Example 55, the at least one non-transitory computer-readable storage medium of any of Examples 46 to 54 may optionally comprise wireless communication instructions that, in response to being executed on the pico eNB, cause the pico eNB to send one or more uplink (UL) power control parameter values to be implemented in conjunction with UL transmissions in the picocell during one or more incongruent UL sub-frames.

Example 56 is a wireless communication method, comprising associating a user equipment (UE) with a pico evolved node B (eNB) in a time-division duplex (TDD) picocell, identifying, by a processor circuit, an incongruent uplink (UL) sub-frame for the picocell, and implementing an enhanced UL transmit power for the incongruent UL sub-frame.

In Example 57, the wireless communication method of Example 56 may optionally comprise using the enhanced UL transmit power to send a UL message during the incongruent UL sub-frame.

In Example 58, the wireless communication method of any of Examples 56 to 57 may optionally comprise configuring one or more UL power control parameters in order to implement the enhanced UL transmit power.

In Example 59, the one or more UL power control parameters of Example 58 may optionally comprise at least one fractional UL power control parameter.

In Example 60, the one or more UL power control parameters of any of Examples 58 to 59 may optionally comprise a target received power parameter $P_O$.

In Example 61, the wireless communication method of Example 60 may optionally comprise incrementing the target received power parameter $P_O$ by a defined margin, based on a received UL power control parameter value.

In Example 62, the one or more UL power control parameters of any of Examples 58 to 61 may optionally comprise a compensation factor $\alpha$.

In Example 63, the wireless communication method of any of Examples 56 to 62 may optionally comprise identifying the incongruent UL sub-frame based on received incongruent UL sub-frame information.

In Example 64, the wireless communication method of any of Examples 56 to 63 may optionally comprise identifying the incongruent UL sub-frame based on received TDD configuration information.

In Example 65, the wireless communication method of any of Examples 56 to 64 may optionally comprise associating the UE with the pico eNB based on an adjacent channel association bias.

Example 66 is at least one non-transitory computer-readable storage medium comprising a set of instructions that, in response to being executed on a computing device, cause the computing device to perform a wireless communication method according to any of Examples 56 to 65.

Example 67 is an apparatus, comprising means for performing a wireless communication method according to any of Examples 56 to 65.

Example 68 is a system, comprising an apparatus according to Example 67, a display, a radio frequency (RF) transceiver, and one or more RF antennas.

Example 69 is a pico evolved node B (eNB), comprising logic, at least a portion of which is in hardware, the logic to determine a TDD configuration for a picocell, receive macrocell configuration information specifying a TDD configuration of an adjacent-channel macrocell, and identify an incongruent downlink (DL) sub-frame by comparing the TDD configuration of the macrocell with the TDD configuration of the picocell.

In Example 70, the logic of Example 69 may optionally use a reduced transmit power to send a DL message during the incongruent DL sub-frame.

In Example 71, the logic of Example 70 may optionally determine the reduced transmit power by decrementing a standard transmit power by a defined margin.

In Example 72, the logic of any of Examples 69 to 71 may optionally receive the macrocell configuration information from a macro eNB of the adjacent-channel macrocell.

In Example 73, the logic of any of Examples 69 to 72 may optionally select the TDD configuration for the picocell based on traffic conditions within the picocell.

In Example 74, the incongruent DL sub-frame of any of Examples 69 to 73 may optionally correspond to an uplink (UL) sub-frame of the adjacent-channel macrocell.

In Example 75, the incongruent DL sub-frame of any of Examples 69 to 73 may optionally correspond to a special sub-frame of the adjacent-channel macrocell.

In Example 76, the logic of any of Examples 69 to 75 may optionally receive the macrocell configuration information over a backhaul connection.

In Example 77, the logic of any of Examples 69 to 76 may optionally send picocell TDD configuration information over a wireless channel, and the picocell TDD configuration information may optionally identify the TDD configuration of the picocell.

In Example 78, the logic of any of Examples 69 to 77 may optionally send one or more uplink (UL) power control parameter values to be implemented in conjunction with UL transmissions in the picocell during one or more incongruent UL sub-frames.

Example 79 is the pico eNB of any of Examples 69 to 78, comprising a radio frequency (RF) transceiver, and one or more RF antennas.

Example 80 is at least one non-transitory computer-readable storage medium, comprising a set of wireless communication instructions that, in response to being executed on a computing device, cause the computing device to associate a user equipment (UE) with a pico evolved node B (eNB) in a time-division duplex (TDD) picocell, identify an incongruent uplink (UL) sub-frame for the picocell, and implement an enhanced UL transmit power for the incongruent UL sub-frame.

In Example 81, the at least one non-transitory computer-readable storage medium of Example 80 may optionally comprise wireless communication instructions that, in response to being executed on the computing device, cause the computing device to use the enhanced UL transmit power to send a UL message during the incongruent UL sub-frame.

In Example 82, the at least one non-transitory computer-readable storage medium of any of Examples 80 to 81 may optionally comprise wireless communication instructions that, in response to being executed on the computing device, cause the computing device to configure one or more UL power control parameters in order to implement the enhanced UL transmit power.

In Example 83, the one or more UL power control parameters of Example 82 may optionally comprise at least one fractional UL power control parameter.

In Example 84, the one or more UL power control parameters of any of Examples 82 to 83 may optionally comprise a target received power parameter $P_O$.

In Example 85, the at least one non-transitory computer-readable storage medium of Example 84 may optionally comprise wireless communication instructions that, in response to being executed on the computing device, cause the computing device to increment the target received power parameter $P_O$ by a defined margin, based on a received UL power control parameter value.

In Example 86, the one or more UL power control parameters of any of Examples 82 to 85 may optionally comprise a compensation factor $\alpha$.

In Example 87, the at least one non-transitory computer-readable storage medium of any of Examples 80 to 86 may optionally comprise wireless communication instructions that, in response to being executed on the computing device, cause the computing device to identify the incongruent UL sub-frame based on received incongruent UL sub-frame information.

In Example 88, the at least one non-transitory computer-readable storage medium of any of Examples 80 to 87 may optionally comprise wireless communication instructions that, in response to being executed on the computing device, cause the computing device to identify the incongruent UL sub-frame based on received TDD configuration information.

In Example 89, the at least one non-transitory computer-readable storage medium of any of Examples 80 to 88 may optionally comprise wireless communication instructions that, in response to being executed on the computing device, cause the computing device to associate the UE with the pico eNB based on an adjacent channel association bias.

Example 90 is a wireless communication method, comprising receiving a small cell evolved node B (eNB) reference signal and an adjacent-channel macrocell eNB reference signal, associating a user equipment (UE) with an eNB of a time-division duplex (TDD) small cell, based on a received signal strength of the small cell eNB reference signal, a received signal strength of the adjacent-channel macrocell eNB reference signal, and an adjacent channel association bias, and identifying, by a processor circuit, an incongruent uplink (UL) sub-frame for the TDD small cell.

In Example 91, the wireless communication method of Example 90 may optionally comprise increasing a UL transmit power during the incongruent UL sub-frame.

In Example 92, the wireless communication method of Example 91 may optionally comprise sending a UL transmission using the increased UL transmit power during the incongruent UL subframe.

In Example 93, the wireless communication method of any of Examples 90 to 92 may optionally comprise identifying the incongruent UL sub-frame based on TDD configuration information for the TDD small cell.

In Example 94, the wireless communication method of Example 93 may optionally comprise receiving the adjacent-channel macrocell eNB reference signal from an eNB of a TDD macrocell, and identifying the incongruent UL sub-frame based on the TDD configuration for the TDD small cell and on TDD configuration information for the TDD macrocell.

In Example 95, the wireless communication method of any of Examples 91 to 94 may optionally comprise modifying at least one UL power control parameter in order to increase the UL transmit power.

In Example 96, the wireless communication method of Example 95 may optionally comprise modifying the at least one UL power control parameter in response to at least one received UL power control parameter value.

In Example 97, the wireless communication method of Example 96 may optionally comprise receiving the at least one received UL power control parameter value from the eNB of the TDD small cell.

In Example 98, the at least one UL power control parameter of any of Examples 95 to 97 may optionally comprise one or more fractional power control parameters.

In Example 99, the one or more fractional power control parameters of Example 98 may optionally comprise one or both of a target received power $P_0$ and a compensation factor α.

Example 100 is at least one non-transitory computer-readable storage medium comprising a set of instructions that, in response to being executed on a computing device, cause the computing device to perform a wireless communication method according to any of Examples 90 to 99.

Example 101 is an apparatus, comprising means for performing a wireless communication method according to any of Examples 90 to 99.

Example 102 is a system, comprising an apparatus according to Example 101, a display, a radio frequency (RF) transceiver, and one or more RF antennas.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. Baseband processing circuitry, comprising:
a memory; and
logic, at least a portion of which is in circuitry coupled to the memory, the logic to:
identify a subframe set based on information comprised in a received message;
identify one or more uplink (UL) power control parameter values for the subframe set; and
determine, based on the one or more UL power control parameter values for the subframe set, a transmit power for transmission by user equipment (UE) of a UL message in a first time-division duplex (TDD) cell during a subframe in the subframe set, the first TDD cell to utilize a first frequency channel, the subframe to comprise a UL subframe according to a dynamically-selected TDD configuration of the first TDD cell, the subframe to comprise a downlink (DL) subframe according to a TDD configuration of a second TDD cell utilizing a second frequency channel that is adjacent to the first frequency channel.

2. The baseband processing circuitry of claim 1, the one or more UL power control parameter values for the subframe set to be comprised in the received message.

3. The baseband processing circuitry of claim 1, the one or more UL power control parameter values for the subframe set to include at least one fractional power control parameter.

4. The baseband processing circuitry of claim 1, the one or more UL power control parameter values for the subframe set to include a target received power parameter $P_0$ for the UE.

5. The baseband processing circuitry of claim 1, the one or more UL power control parameter values for the subframe set to include a compensation factor parameter $\alpha$.

6. The baseband processing circuitry of claim 1, the transmit power to comprise an increased transmit power selected to mitigate interference at an evolved node B (eNB).

7. The baseband processing circuitry of claim 1, the subframe to comprise an incongruent UL subframe.

8. A system, comprising:
the baseband processing circuitry of claim 1;
at least one radio frequency (RF) transceiver; and
at least one RF antenna.

9. At least one non-transitory computer-readable storage medium comprising a set of instructions that, in response to being executed at user equipment (UE), cause the UE to:
identify a subframe set based on information comprised in a received control message;
identify one or more uplink (UL) power control values for the subframe set; and
determine, based on the one or more UL power control values for the subframe set, a transmit power for transmission by the UE of a UL message in a first time-division duplex (TDD) cell during a subframe in the subframe set, the first TDD cell to utilize a first frequency channel, the subframe to comprise a UL subframe according to a dynamically-selected TDD configuration of the first TDD cell, the subframe to comprise a downlink (DL) subframe according to a TDD configuration of a second TDD cell utilizing a second frequency channel that is adjacent to the first frequency channel.

10. The at least one non-transitory computer-readable storage medium of claim 9, the one or more UL power control values to be comprised in the received message.

11. The at least one non-transitory computer-readable storage medium of claim 9, the one or more UL power control values to include at least one fractional power control parameter.

12. The at least one non-transitory computer-readable storage medium of claim 9, the one or more UL power control values to include a target received power parameter $P_0$ for the UE.

13. The at least one non-transitory computer-readable storage medium of claim 9, the one or more UL power control values to include a compensation factor parameter $\alpha$.

14. The at least one non-transitory computer-readable storage medium of claim 9, the transmit power to comprise an increased transmit power selected to mitigate interference at an evolved node B (eNB).

15. The at least one non-transitory computer-readable storage medium of claim 9, the subframe to comprise an incongruent UL subframe.

16. User equipment (UE), comprising:
a radio frequency (RF) transceiver to receive a control message from an evolved node B (eNB) of a first time-division duplex (TDD) cell; and
logic, at least a portion of which is in circuitry coupled to the RF transceiver, the logic to:
identify one or more subframes based on the control message;
identify one or more uplink (UL) power control parameters for the one or more subframes; and
determine, based on the one or more UL power control parameters for the one or more subframes, a transmit power for UL transmission of the UE in the first TDD cell during the one or more subframes, the first TDD cell to utilize a first frequency channel, the one or more subframes to comprise UL subframes according to a dynamically-selected TDD configuration of the first TDD cell, the one or more subframes to comprise downlink (DL) subframes according to a TDD configuration of a second TDD cell utilizing a second frequency channel that is adjacent to the first frequency channel.

17. The UE of claim 16, the one or more UL power control parameters to be comprised in the control message.

18. The UE of claim 16, the one or more UL power control parameters to include at least one fractional power control parameter.

19. The UE of claim 16, the one or more UL power control parameters to include a target received power parameter $P_0$ for the UE.

20. The UE of claim 16, the one or more UL power control parameters to include a compensation factor parameter $\alpha$.

21. The UE of claim 16, the transmit power to comprise an increased transmit power selected to mitigate interference at the eNB.

22. The UE of claim 16, the subframe to comprise an incongruent UL subframe of the TDD cell.

* * * * *